United States Patent
Bono

(10) Patent No.: US 9,153,827 B2
(45) Date of Patent: Oct. 6, 2015

(54) FUEL CELL SYSTEM AND METHOD OF CONTROLLING ROTATION SPEED OF COMPRESSOR

(75) Inventor: Tetsuya Bono, Nishikamo-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1088 days.

(21) Appl. No.: 12/738,267

(22) PCT Filed: Sep. 3, 2008

(86) PCT No.: PCT/JP2008/065826
§ 371 (c)(1),
(2), (4) Date: Apr. 15, 2010

(87) PCT Pub. No.: WO2009/050952
PCT Pub. Date: Apr. 23, 2009

(65) Prior Publication Data
US 2010/0239934 A1 Sep. 23, 2010

(30) Foreign Application Priority Data
Oct. 16, 2007 (JP) .................................. 2007-268771

(51) Int. Cl.
*H01M 8/04* (2006.01)

(52) U.S. Cl.
CPC ...... *H01M 8/04395* (2013.01); *H01M 8/04089* (2013.01); *H01M 8/04335* (2013.01); *H01M 8/04776* (2013.01); *H01M 8/04097* (2013.01); *H01M 8/04164* (2013.01); *H01M 2250/20* (2013.01); *Y02E 60/50* (2013.01); *Y02T 90/32* (2013.01)

(58) Field of Classification Search
USPC ........................................................ 429/442
See application file for complete search history.

(56) References Cited

U.S. PATENT DOCUMENTS

2006/0222918 A1* 10/2006 Koike ............................. 429/24

FOREIGN PATENT DOCUMENTS

| CN | 1812176 A | 8/2006 |
|---|---|---|
| DE | 102 22 422 B4 | 10/2007 |
| EP | 1 643 574 A1 | 4/2006 |

(Continued)

*Primary Examiner* — Ula C. Ruddock
*Assistant Examiner* — Jacob Marks
(74) *Attorney, Agent, or Firm* — Kenyon & Kenyon LLP

(57) ABSTRACT

Even when the atmospheric pressure is lowered, a sufficient amount of oxidant gas is supplied to a fuel cell without causing any failure in a compressor. A control unit judges whether or not both the following conditions are satisfied: the accelerator opening degree detected by an accelerator opening degree sensor is equal to or larger than a predetermined opening degree; and the state where the atmospheric pressure detected by a pressure sensor is equal to or lower than a predetermined pressure value has been maintained for a predetermined time period or longer. If the judgment result is positive, the control unit changes the maximum rotation speed permitted in the compressor from a normal maximum rotation speed to an increased maximum rotation speed. The control unit then judges whether or not a predetermined time period has elapsed from when the maximum rotation speed was changed to the increased maximum rotation speed, and also judges whether or not the state where a discharge temperature of the compressor detected by the temperature sensor is equal to or higher than a predetermined temperature has been maintained for a predetermined time or longer. If the result of at least one of these judgments is positive, the control unit returns the maximum rotation speed to the normal maximum rotation speed.

6 Claims, 2 Drawing Sheets

(56) References Cited

FOREIGN PATENT DOCUMENTS

| JP | 2000-048838 A | 2/2000 |
| JP | 2003-168467 A | 6/2003 |
| JP | 2004-165087 A | 6/2004 |
| JP | 2006-006088 A | 1/2006 |
| JP | 2006-324018 A | 11/2006 |
| JP | 2006-333602 A | 12/2006 |
| JP | 2007-087811 A | 4/2007 |

* cited by examiner

FUEL CELL SYSTEM AND METHOD OF CONTROLLING ROTATION SPEED OF COMPRESSOR

This is a 371 national phase application of PCT/JP2008/065826 filed 3 Sep. 2008, which claims priority to Japanese Patent Application No. 2007-268771 filed 16 Oct. 2007, the contents of which are incorporated herein by reference.

FIELD OF THE INVENTION

The invention relates to a fuel cell system and a method of controlling the rotation speed of a compressor.

BACKGROUND OF THE INVENTION

Recently, developments have been made for fuel cell systems using, as energy sources, fuel cells that generate electrical power through a chemical reaction between a fuel gas and an oxidant gas serving as reactant gasses. In order to generate electrical power efficiently in a fuel cell system, the amounts of supply of the fuel gas and the oxidant gas need to be optimally adjusted. However, since the amounts of supply of the reactant gasses vary in accordance with usage environments, such optimal adjustment is not easy. For example, when the fuel cell system is used in a highland, the density of the air is lowered and the amount of the oxidant gas supplied to a fuel cell becomes insufficient, thereby resulting in the efficiency of power generation being lowered. In order to solve such a problem, in the fuel cell system disclosed in patent document 1, when the atmospheric pressure is lowered, the amount of oxidant gas supplied to the fuel cell is maintained by increasing the rotation speed of the compressor.

Patent document 1: JP2000-48838 A

DISCLOSURE OF THE INVENTION

Problem to be Solved by the Invention

In the fuel cell system disclosed in patent document 1 above, the rotation speed of the compressor is controlled in accordance with a value obtained by dividing 1 atmospheric pressure by the current atmospheric pressure, in order to prevent the power generation efficiency from being lowered. However, in situations where such a control method is employed, for example, when the atmospheric pressure is greatly lowered, the rotation speed which exceeds the maximum permissible rotation speed of a compressor would be set, which might result in the occurrence of a failure in the compressor. Also, in situations where the maximum permissible rotation speed has been set to low, even if the rotation speed of the compressor is controlled to be the maximum permissible rotation speed, the amount of oxidant gas supplied to the fuel cell might be insufficient.

The present invention has been made in order to solve the problem above in the related art, and an object of the present invention is to provide a fuel cell system and a method of controlling the rotation speed of a compressor which are capable of, even when the atmospheric pressure is lowered, supplying a sufficient amount of oxidant gas to a fuel cell without causing any failure in a compressor.

Means for Solving the Problem

In order to solve the problem above, provided according to the present invention is a fuel cell system a fuel cell which is supplied with reactant gasses and generates electrical power through an electrochemical reaction between the reactant gasses; a compressor which supplies an oxidant gas in the reactant gasses to the fuel cell; a pressure sensor which detects an atmospheric pressure; a judgment means which judges whether or not the atmospheric pressure detected by the pressure sensor is equal to or lower than a predetermined pressure value; and a rotation speed control means which increases a maximum rotation speed permitted in the compressor for a predetermined time period when the judgment means determines that the atmospheric pressure is equal to or lower than the predetermined pressure value.

Provided according to the present invention is a method of controlling a rotation speed of a compressor in a fuel cell system which comprises: a fuel cell which is supplied with reactant gasses and generates electrical power through an electrochemical reaction between the reactant gasses; a compressor which supplies an oxidant gas in the reactant gasses to the fuel cell; and a pressure sensor which detects an atmospheric pressure, the method comprising: a judgment step of judging whether or not the atmospheric pressure detected by the pressure sensor is equal to or lower than a predetermined pressure value; and a rotation speed control step of increasing, when it is determined that the atmospheric pressure is equal to or lower than the predetermined pressure value in the judgment step, a maximum rotation speed permitted in the compressor for a predetermined time period.

With such configurations of the present invention, when the atmospheric pressure is lowered to the predetermined pressure value or lower, the maximum rotation speed permitted in the compressor can be increased for a predetermined time period. Accordingly, even when the atmospheric pressure is lowered, a sufficient amount of oxidant gas can be supplied to the fuel cell without causing any failure in the compressor.

In the fuel cell system above, the judgment means judges whether or not a state where the atmospheric pressure is equal to or lower than the predetermined pressure value has been maintained for a second predetermined time period or longer, and the rotation speed control means can increase the maximum rotation speed for the predetermined time period when the judgment means determines that the state where the atmospheric pressure is equal to or lower than the predetermined pressure value has been maintained for the second predetermined time period or longer.

With such a configuration, when the atmospheric pressure continues to be equal to or lower than the predetermined pressure value for the second predetermined time period or longer, the maximum rotation speed can be increased for the predetermined time period, and thus if the pressure value is temporarily lowered due to certain factors, the maximum rotation speed can be prevented from being increased and the normal maximum rotation speed can be continued.

In the fuel cell system above, the judgment means judges whether or not both conditions in which: an amount of rotation speed increase command for the compressor is equal to or larger than a predetermined amount; and a state where the atmospheric pressure is equal to or lower than the predetermined pressure value has been maintained for the second predetermined time period or longer, are satisfied, and the rotation speed control means can increase the maximum rotation speed for the predetermined time period when the judgment means determines that both the conditions in which: the amount of rotation speed increase command is equal to or larger than the predetermined amount; and the state where the atmospheric pressure is equal to or lower than the predetermined pressure value has been maintained for the second predetermined time period or longer, are satisfied. Here, the "amount of rotation speed increase command" may be, in a fuel cell system provided in a vehicle for example, the amount of operation of an acceleration member (accelerator opening degree). As described above, by employing, in the criteria for increasing the maximum rotation speed, the condition in which the amount of rotation speed increase command for the compressor is equal to or larger the predetermined amount, the maximum rotation speed can be increased only in a limited situation where the rotation speed of the compressor is highly likely to reach the maximum rotation speed.

The fuel cell system above further comprises: a temperature sensor which detects a temperature of the oxidant gas discharged from the compressor; and a second judgment means which judges whether or not the temperature detected by the temperature sensor becomes equal to or higher than a predetermined temperature during a predetermined time period from when the maximum rotation speed was increased by the rotation speed control means, wherein the rotation speed control means can change the maximum rotation speed to a rotation speed before being increased when the second judgment means determines that the temperature becomes equal to or higher than the predetermined temperature.

With such a configuration, after increasing the maximum rotation speed, a failure in the compressor which might occur as a result of the increase of the maximum rotation speed can be prevented.

In the fuel cell system above, the second judgment means judges whether or not a state where the temperature detected by the temperature sensor is equal to or higher than the predetermined temperature has been maintained for a third predetermined time period or longer during the time period from when the maximum rotation speed was increased; and the rotation control means can change the maximum rotation speed to a rotation speed before being increased when the second judgment means determines that the state where the temperature is equal to or higher than the predetermined temperature has been maintained for the third predetermined time period or longer.

With such a configuration, when the discharge temperature of the compressor is temporarily increased due to certain factors after the increase of the maximum rotation speed, the increased maximum rotation speed can be continued without returning to the original maximum rotation.

Effect of the Invention

According to the present invention, even when the atmospheric pressure is lowered, a sufficient amount of oxidant gas can be supplied to the fuel cell without causing any failure in the compressor.

DESCRIPTION OF REFERENCE NUMERALS

1: fuel cell system, 2: fuel cell, 3: oxidant gas pipe system, 4: hydrogen gas pipe system, 5: control unit, 30: filter, 31: compressor, 32: air supply flow path, 33: air discharge flow path, 34: humidifier, 40: hydrogen tank, 41: hydrogen supply flow path, 42: circulation flow path, 43: main stop valve, 44: regulator, 45: hydrogen pump, 46: gas-liquid separator, 47: exhaust/drain valve, 48: discharge flow path, 49: diluter, N: rotation speed sensor, P: pressure sensor, T: temperature sensor, S: accelerator open degree sensor Best Mode for Carrying out the Invention A preferred embodiment of a fuel cell system and a method of controlling the rotation speed of a compressor according to the present invention will be described below with reference to the attached drawings. The following description describes an embodiment in which the fuel cell system according to the present invention is used as an in-vehicle power generation system in a fuel cell hybrid vehicle (FCHV).

The fuel cell system in the present embodiment is capable of, even in situations where the atmospheric pressure is lowered, supplying a sufficient amount of oxidant gas to a fuel cell without causing any failure in a compressor by increasing the maximum permissible rotation speed of a compressor for a predetermined time period when the atmospheric pressure is lowered to a predetermined pressure value or lower. The configuration and operation of a fuel cell system having such a feature will be described in detail below.

Figure 1:
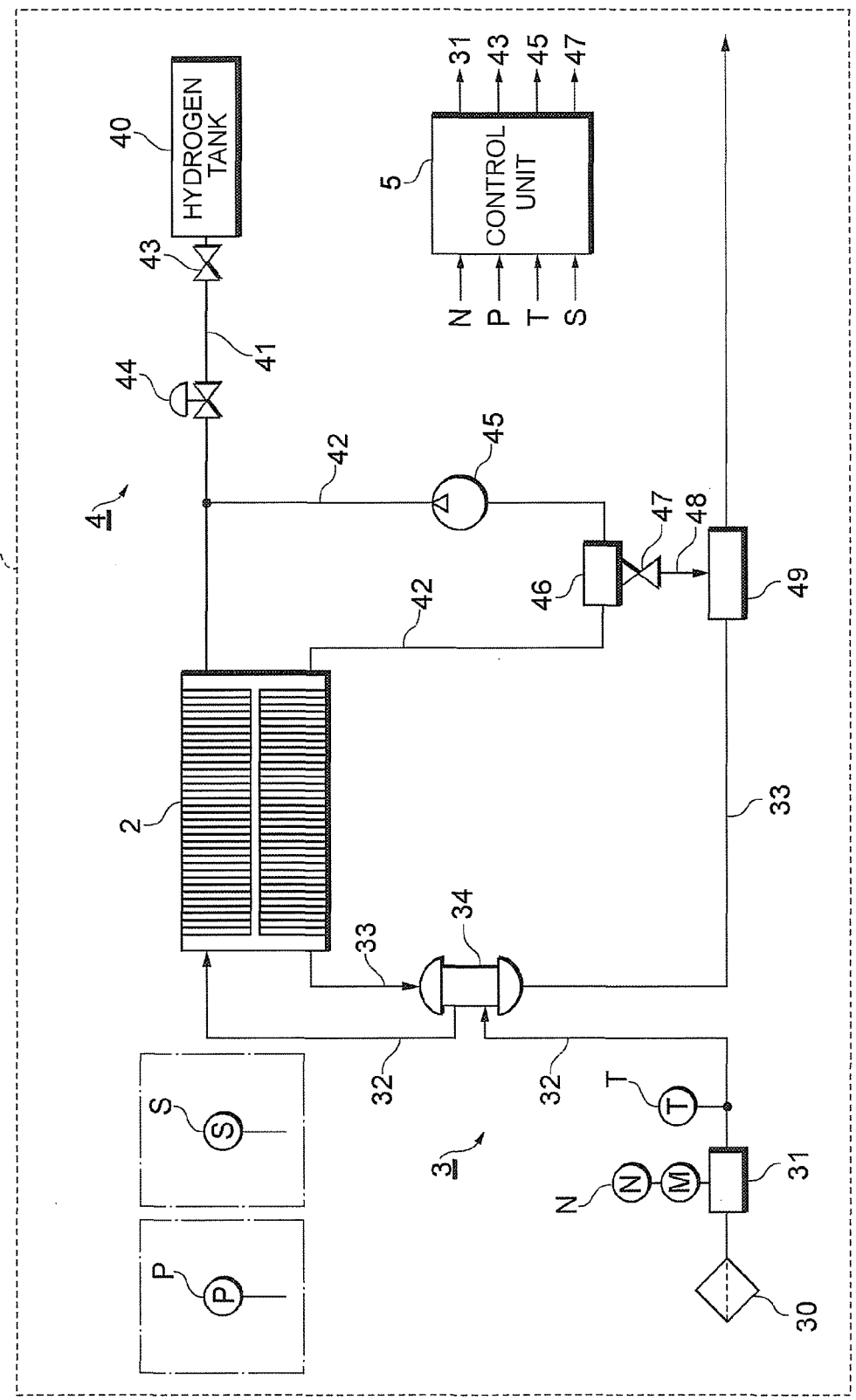
FIG. 1 is a configuration diagram schematically showing a fuel cell system in an embodiment.

First, the configuration of the fuel cell system in the present embodiment will be described below with reference to FIG. 1. FIG. 1 is a configuration diagram schematically showing a fuel cell system in the present embodiment.

As shown in FIG. 1, a fuel cell system 1 includes: a fuel cell 2 which generates electrical power through an electrochemical reaction between an oxidant gas and a fuel gas serving as reactant gasses; an oxidant gas pipe system 3 which supplies the air serving as the oxidant gas to the fuel cell 2; a hydrogen gas pipe system 4 which supplies hydrogen serving as the fuel gas to the fuel cell 2; and a control unit 5 which centrally controls the entire system.

The fuel cell 2 has a stack structure in which a plurality of unit cells is stacked, the unit cells being supplied with the reactant gasses and generating electrical power. A part of direct-current electrical power generated by the fuel cell 2 is, with its voltage reduced by a DC/DC converter (not shown), charged to a secondary battery (not shown) being a battery.

The oxidant gas pipe system 3 includes: a compressor 31 which compresses the air introduced via a filter 30 and sends the compressed air as the oxidant gas; an air supply flow path 32 for supplying the oxidant gas to the fuel cell 2; and an air discharge flow path 33 for discharging an oxidant-off gas discharged from the fuel cell 2. The air supply flow path 32 and the air discharge flow path 33 are provided with a humidifier 34 which humidifies the oxidant gas compressed and sent by the compressor 31 using an oxidant-off gas discharged from the fuel cell 2. After being subjected to moisture exchange in the humidifier 34, the oxidant-off gas is finally exhausted to the atmosphere outside the system as exhaust gas. The compressor 31 is provided with a rotation speed sensor N which detects the rotation speed of a motor included in the compressor 31. A temperature sensor T which detects the temperature of the oxidant gas discharged from the compressor 31 (hereinafter referred to as a "discharge temperature") is further provided on the outlet side of the compressor 31.

The hydrogen gas pipe system 4 includes: a hydrogen tank 40 serving as a fuel supply source which stores hydrogen gas having a high pressure (e.g., 70 MPa); a hydrogen supply path 41 serving as a fuel supply flow path for supplying the hydrogen gas in the hydrogen tank 40 to the fuel cell 2; and a circulation flow path 42 for returning a hydrogen-off gas discharged from the fuel cell 2 to the hydrogen supply path 41. Note that the hydrogen pipe system 4 is an embodiment of the fuel supply system in the present invention. Although the hydrogen tank 40 is used as the fuel supply source in the present embodiment, the hydrogen tank 40 may be replaced with, for example, a modifier which modifies a hydrocarbon fuel to a hydrogen-enriched fuel using water vapor and a high-pressure gas tank which stores the fuel gas, which has been modified by the modifier, in a high-pressure state. Also, a tank having a hydrogen-absorbing alloy can be used as the fuel supply source.

The hydrogen supply flow path 41 is provided with: a main stop valve 43 which shuts off or allows the supply of hydrogen gas from the hydrogen tank 40; and a regulator 44 which regulates the pressure of the hydrogen gas to a preset secondary pressure.

The circulation flow path 42 is provided with a hydrogen pump 45 which compresses the hydrogen-off gas in the circulation flow path 42 and sends the compressed hydrogen-off gas toward the hydrogen supply flow path 41. The circulation flow path 42 is connected to a discharge flow path 48 via a gas-liquid separator 46 and an exhaust/drain valve 47. The gas-liquid separator 46 collects moisture from the hydrogen-off gas. The exhaust/drain valve 47 purges the moisture collected by the gas-liquid separator 46 and the hydrogen-off gas containing impurities in the circulation path 42 in accordance with a command from the control unit 5. The hydrogen-off gas discharged from the exhaust/drain valve 47 is diluted by a diluter 49 and merges with the oxidant-off gas in the air discharge flow path 33.

The control unit 5 detects the amount of operation of an acceleration member (accelerator) (e.g., the degree of opening of the accelerator) provided in a fuel cell hybrid vehicle using a sensor (e.g., accelerator opening degree sensor S), receives control information such as an acceleration request value (e.g., the amount of power generation required by power-consuming apparatuses such as a traction motor), and controls the operation of various appliances in the system. Examples of the power-consuming apparatuses may include, in addition to the traction motor, auxiliary apparatuses required for operating the fuel cell 2 (e.g., motors for the compressor 31 and the hydrogen pump 45, etc.); actuators used in various apparatuses relevant to the travel of the vehicle (e.g., a speed change gear, a wheel control apparatus, a steering gear and a suspension); and an air-conditioning apparatus (air conditioner), lighting equipment, an audio system, etc. which are provided in a passenger compartment.

The control unit 5 judges whether or not both the following conditions are satisfied: the accelerator opening degree detected by the accelerator opening degree sensor S is equal to or larger than a predetermined opening degree; and the state where the atmospheric pressure detected by the pressure sensor P for measuring the atmospheric pressure is equal to or lower than a predetermined pressure value has been maintained for a predetermined time period or longer. The predetermined opening degree used for judging the accelerator opening degree may be set to, for example, 95%; the predetermined pressure value used for judging the atmospheric pressure may be set to, for example, 90 kPa; and the predetermined time used for judging the duration of time may be set to, for example, 3 seconds.

When determining that: the accelerator opening degree is equal to or larger than the predetermined opening degree; and the state where the atmospheric pressure is equal to or lower than the predetermined pressure value has been maintained for the predetermined time period or longer, the control unit 5 performs maximum rotation speed increase processing for increasing the maximum rotation speed permitted in the compressor 31 for a predetermined time period. The content of the maximum rotation speed increase processing will be described in detail below. First, the control unit 5 changes the maximum rotation speed permitted in the compressor 31 to an increased maximum rotation speed, which is a rotation speed higher than the normal maximum rotation speed. Then, when the predetermined time period elapses from when the rotation speed was changed to the increased maximum rotation speed, the control unit 5 changes the maximum rotation speed to the normal maximum rotation speed, and thereby ends the maximum rotation speed increase processing. The normal maximum rotation speed may be set to, for example, 5700 rpm, while the increased maximum rotation speed may be set to, for example, 6000 rpm. The predetermined time used for judging the time elapsed from when the maximum rotation speed was changed to the increased maximum rotation speed may be set to, for example, 180 seconds. Note that the pressure sensor P may be provided in, for example, an engine room.

While the maximum rotation speed increase processing is performed, the control unit 5 further judges whether or not the state where a discharge temperature of the compressor 31 detected by the temperature sensor T is equal to or higher than a predetermined temperature has been maintained for a predetermined time period or longer. The predetermined temperature used for judging the discharge temperature of the compressor 31 may be set to, for example, 170° C., and the predetermined time period used for judging the duration of time of the predetermined temperature or higher may be set to, for example, 20 seconds.

When determining that the state where the discharge temperature of the compressor 31 is equal to or higher than the predetermined temperature has been maintained for the predetermined time period or longer, the control unit 5 forcibly changes the maximum rotation speed permitted in the compressor 31 to the normal maximum rotation speed, and thereby ends the maximum rotation speed increase processing in the middle of the processing.

The control unit 5 physically has, for example, a CPU, a ROM or an

HDD which stores a control program and control data used in the CPU, a RAM used as various work areas mainly for control processing, and input-output interfaces. These components are connected to each other via a bus. The input and output interfaces are connected to various sensors such as the rotary speed sensor N, the pressure sensor P, the temperature sensor T and the accelerator opening degree sensor S, as well as to various drivers for driving the compressor 31, the main stop valve 43, the hydrogen pump 45, the exhaust/drain valve 47, etc.

The CPU receives detection results in the rotation speed sensor N, the pressure sensor P, the temperature sensor T, and the accelerator opening degree sensor S via the input-output interfaces, and processes the received detection results using various types of data in the RAM, in accordance with the control program stored in the ROM, thereby controlling the compressor rotation speed control processing in the fuel cell system 1. The CPU outputs control signals to the various drivers via the input-output interfaces and thereby controls the entire fuel cell system 1.

Figure 2:
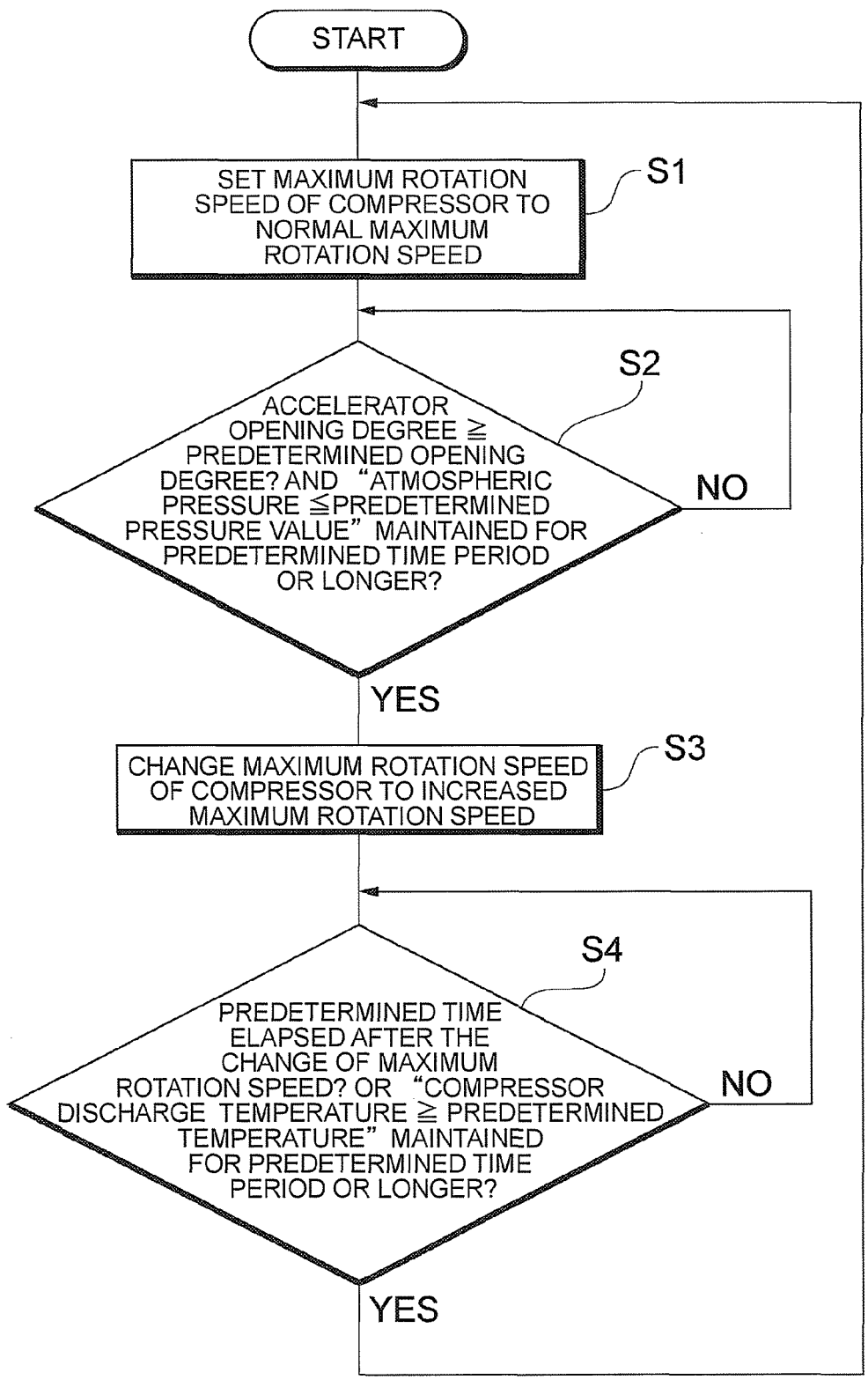
FIG. 2 is a flowchart explaining compressor rotation speed control processing in the fuel cell system shown in FIG. 1.

Next, the compressor rotation speed control processing in the fuel cell system in the present embodiment will be described below with reference to the flowchart shown in FIG. 2. The compressor rotation speed control processing is performed repeatedly from when an ignition key is turned ON until the ignition key is turned OFF.

First, the compressor sets the maximum rotation speed of the compressor to the normal maximum rotation speed (step S1).

The control unit 5 then judges whether or not both the following conditions are satisfied: an accelerator opening degree detected by the accelerator opening degree sensor S is equal to or larger than a predetermined opening degree; and the state where the atmospheric pressure detected by the pressure sensor P is equal to or lower than a predetermined pressure value has been maintained for a predetermined time period or longer (step S2). If the result of the judgment is negative (step S2; NO), the operation of step S2 is repeated.

On the other hand, if the result of the judgment in step S2 is positive (step S2; YES), the control unit 5 changes the maximum rotation speed permitted in the compressor 31 from the normal maximum rotation speed to the increased maximum rotation speed (step S3).

The control unit 5 then judges whether or not a predetermined period has elapsed from when the maximum rotation speed was changed to the increased maximum rotation speed, and also judges whether or not the state where the discharge temperature of the compressor 31, which is detected by the temperature sensor T, is equal to or higher than a predetermined temperature has been maintained for a predetermined time period or longer (step S4). If the results of both the judgments are negative (step S4; NO), the operation of step S4 is repeated.

On the other hand, if the result of at least one of the judgments in step S4 is positive (step S4; YES), the processing proceeds to step S1 above. The maximum permissible rotation speed of the compressor 31 is accordingly changed to the normal maximum rotation speed.

Note that, although the maximum rotation speed of the compressor is set to the normal maximum rotation speed in step S1 in the above description of operations, the operation of step S1 can be omitted immediately after the ignition key is turned ON by re-setting the maximum rotation speed to the normal maximum rotation speed when the ignition key is turned OFF.

As described above, in the fuel cell system 1 in the present embodiment, in situations where the accelerator opening degree is equal to or larger than a predetermined degree and the atmospheric pressure continues to be equal to or lower than a predetermined pressure value for a predetermined time period or longer, the maximum rotation speed increase processing described above is performed, so that the maximum permissible rotation speed permitted in the compressor 31 can be increased for a predetermined time period. With such a configuration, even when the atmospheric pressure is lowered, a sufficient amount of oxidant gas can be supplied to the fuel cell without causing any failure in the compressor.

In addition, in the fuel cell system 1 in the present embodiment, when the temperature of the oxidant gas discharged from the compressor 31 becomes a predetermined temperature or higher while the maximum rotation speed increase processing is being performed, the maximum rotation speed can be returned to the normal maximum rotation speed, so that a failure which might occur as a result of the increase of the maximum rotation speed can be prevented.

Note that, although the embodiment above has described, as a criterion for starting the maximum rotation speed increase processing, the conditions in which: the accelerator opening degree is equal to or larger than a predetermined degree; and the state where the atmospheric pressure is equal to or lower than a predetermined pressure value has been maintained for a predetermined time period or longer, the criteria for starting the processing is not limited thereto. Other criteria for starting the processing may be employed as long as the criteria contain at least the condition in which the atmospheric pressure is equal to or lower than a predetermined pressure value. However, by employing, in the criteria for starting the processing, the condition in which the accelerator opening degree is equal to or larger than a predetermined degree, the maximum rotation speed increase processing can be performed only in a limited situation where the rotation speed of the compressor is highly likely to reach the maximum rotation speed. Furthermore, by employing, in the criteria for starting the processing, the condition in which a low pressure state is maintained for a predetermined time period or longer, when a pressure value is temporarily lowered due to certain factors, the maximum rotation speed can be prevented from being increased and the normal maximum rotation speed can be continued.

Although the embodiment above has described, as one of criteria for ending the maximum rotation speed increase processing, in addition to the duration time of the maximum rotation speed increase processing, the state where the discharge temperature of the compressor 31 detected by the temperature sensor T is equal to or higher than a predetermined temperature or higher being maintained for a predetermined time period or longer, the criteria for ending the processing is not limited thereto. Other criteria for ending the processing may be employed as long as the criteria at least contain the condition in which the discharge temperature becomes equal to or higher than a predetermined temperature, in addition to the duration time of the maximum rotation speed increase processing. However, by employing, in the criteria for ending the processing, the condition in which a high temperature state is maintained for a predetermined time or longer, the maximum rotation speed increase processing can be continued without being ended even when the discharge temperature is temporarily increased due to certain factors.

Although the embodiment above has described the configuration in which the fuel cell system according to the present invention is provided in a fuel cell hybrid vehicle, the fuel cell system according to the present invention may be applied to various mobile objects (e.g., robots, ships and airplanes) other than fuel cell hybrid vehicles. In addition, the fuel cell system according to the present invention may also be applied to stationary power generation systems used as power generating equipment for constructions (e.g., houses and buildings).

Industrial Applicability

The fuel cell system and the method of controlling the rotation speed of a compressor according to the present invention are suitable for use in supplying a sufficient amount of oxidant gas to a fuel cell even in situations where the atmospheric pressure is lowered.

What is claimed is:

1. A fuel cell system, comprising:
   a fuel cell which is supplied with reactant gasses and generates electrical power through an electrochemical reaction between the reactant gasses;
   a compressor which supplies an oxidant gas in the reactant gasses to the fuel cell;
   a pressure sensor which detects an atmospheric pressure;
   a judgment unit programmed to judge whether or not the atmospheric pressure detected by the pressure sensor is equal to or lower than a permissible lower limit pressure value which serves as a criterion for judging whether or not the atmospheric pressure is so low that the oxidant gas to be supplied to the fuel cell becomes insufficient; and a rotation speed control unit which, when the judgment unit determines that the atmospheric pressure is equal to or lower than the permissible lower limit pressure value, is programmed to increase a maximum rotation speed permitted in the compressor for a permissible upper limit time period such that the compressor is durable without causing a failure even if the compressor operation with the maximum rotation speed, wherein:

the judgment unit is programmed to judge whether or not a state where the atmospheric pressure is equal to or lower than the permissible lower limit pressure value has been maintained for a continuation recognizable time period or longer, the continuation recognizable time serving as a criterion for judging whether a low pressure state is temporary or not; and the rotation speed control unit is programmed to increase the maximum rotation speed for the permissible upper limit time period when the judgment unit determines that the state where the atmospheric pressure is equal to or lower than the permissible lower limit pressure value has been maintained for the continuation recognizable time period or longer.

2. The fuel cell system according to claim 1, wherein:
the judgment unit is programmed to judge whether or not both conditions in which: an accelerator opening degree is equal or larger than a permissible upper limit which serves as a criterion for judging whether or not there is a high possibility that a rotation speed of the compressor reaches the maximum rotation speed; and a state where the atmospheric pressure is equal to or lower than the predetermined pressure value has been maintained for the second predetermined time period or longer, are satisfied; and the rotation speed control unit is programmed to increase the maximum rotation speed for the predetermined time period when the judgment unit determines that both the conditions in which: the accelerator opening degree is equal to or larger than the permissible upper limit; and the state where the atmospheric pressure is equal to or lower than the predetermined pressure value has been maintained for the second predetermined time period or longer, are satisfied.

3. The fuel cell system according to claim 1, further comprising:
a temperature sensor which detects a temperature of the oxidant gas discharged from the compressor; and
a second judgment unit is programmed to judge whether or not the temperature detected by the temperature sensor becomes equal to or higher than a permissible upper limit temperature during a predetermined time period from when the maximum rotation speed was increased by the rotation speed control unit, the permissible upper limit temperature serving as a criterion for judging whether or not a failure occurs in the compressor,
wherein the rotation speed control unit is programmed to change the maximum rotation speed to a rotation speed before being increased when the second judgment unit determines that the temperature becomes equal to or higher than the permissible upper limit temperature.

4. The fuel cell system according to claim 3, wherein:
the second judgment unit is programmed to judge whether or not a state where the temperature detected by the temperature sensor is equal to or higher than the predetermined temperature has been maintained for a second continuation recognizable time period or longer during the time period from when the maximum rotation speed was increased, the second continuation recognizable time period serving as a criterion for judging whether a temperature rise is temporary or not; and the rotation speed control unit is programmed to change the maximum rotation speed to a rotation speed before being increased when the second judgment unit determines that the state where the temperature is equal to or higher than the predetermined temperature has been maintained for the second continuation recognizable time period or longer.

5. The fuel cell system according to claim 2, further comprising:
a temperature sensor which detects a temperature of the oxidant gas discharged from the compressor; and
a second judgment unit is programmed to judge whether or not the temperature detected by the temperature sensor becomes equal to or higher than a permissible upper limit temperature during a predetermined time period from when the maximum rotation speed was increased by the rotation speed control unit, the-permissible upper limit temperature serving as a criterion for judging whether or not a failure occurs in the compressor,
wherein the rotation speed control unit is programmed to change the maximum rotation speed to a rotation speed before being increased when the second judgment unit determines that the temperature becomes equal to or higher than the permissible upper limit temperature.

6. The fuel cell system according to claim 5, wherein:
the second judgment unit is programmed to judge whether or not a state where the temperature detected by the temperature sensor is equal to or higher than the predetermined temperature has been maintained for a second continuation recognizable time period or longer during the time period from when the maximum rotation speed was increased, the second continuation recognizable time period serving as a criterion for judging whether a temperature rise is temporary or not; and the rotation speed control unit is programmed to change the maximum rotation speed to a rotation speed before being increased when the second judgment unit determines that the state where the temperature is equal to or higher than the predetermined temperature has been maintained for the second continuation recognizable time period or longer.

* * * * *